(12) United States Patent
Simpson (10) Patent No.: US 8,952,780 B2
(45) Date of Patent: Feb. 10, 2015

(54) SECURITY CASE

(75) Inventor: Anthony T. Simpson, Lake, FL (US)

(73) Assignee: ShadowTrack 247, LLC, Asheville, NC (US)

( * ) Notice: Subject to any disclaimer, the term of this patent is extended or adjusted under 35 U.S.C. 154(b) by 0 days.

(21) Appl. No.: 13/101,336

(22) Filed: May 5, 2011

(65) Prior Publication Data

US 2012/0279875 A1 Nov. 8, 2012

(51) Int. Cl.
| | |
|---|---|
| *G05B 19/00* | (2006.01) |
| *A45C 13/18* | (2006.01) |
| *H04W 4/02* | (2009.01) |
| *G07C 9/00* | (2006.01) |
| *G08B 1/08* | (2006.01) |
| *A45C 13/10* | (2006.01) |
| *H02B 1/00* | (2006.01) |

(52) U.S. Cl.
CPC ............... *A45C 13/10* (2013.01); *A45C 13/18* (2013.01); *H04W 4/02* (2013.01); *G07C 9/00912* (2013.01); *G07C 9/00944* (2013.01)
USPC ......... 340/5.2; 340/539.13; 206/1.5; 361/600

(58) Field of Classification Search
USPC .......... 340/5.2, 539.13; 206/1.5, 1.6; 705/1.1; 713/186; 190/111; 361/600
See application file for complete search history.

(56) References Cited

U.S. PATENT DOCUMENTS

| | | | | |
|---|---|---|---|---|
| 7,949,541 | B2* | 5/2011 | McGinn et al. | 705/1.1 |
| 8,068,023 | B2* | 11/2011 | Dulin et al. | 340/539.13 |
| 8,284,023 | B2* | 10/2012 | Coutermarsh et al. | 340/5.73 |
| 2003/0023855 | A1* | 1/2003 | Keogh et al. | 713/186 |
| 2004/0163913 | A1* | 8/2004 | Tschudy | 190/111 |
| 2005/0225432 | A1 | 10/2005 | Lindskog | |
| 2010/0085146 | A1* | 4/2010 | Johnson | 340/5.53 |

* cited by examiner

*Primary Examiner* — Jennifer Mehmood
*Assistant Examiner* — Omar Casillashernandez
(74) *Attorney, Agent, or Firm* — McHale & Slavin P.A.

(57) ABSTRACT

The present invention is a self contained, portable security case or container. The case is secure in its locked condition by locks which are preferably operated by an electronic key. The electronic key can be programmed to open the case or container dependent upon various different conditions, for example, location, time, identification of operator, etc. In addition to the electronic key, a biometric identification device can be employed. The exterior of the case or container is made from different materials which are impermeable and resistant to heat, drilling and ballistic impact. A GPS type of location device located within the case enables the case to be tracked from remote locations.

18 Claims, 13 Drawing Sheets

SECURITY CASE

FIELD OF THE INVENTION

The present invention relates to the secure transportation of valuable objects; in particular, it relates to a portable container which restricts access to the contents within the container to authorized individuals and enables the container to be tracked.

BACKGROUND OF THE INVENTION

With crime always on the rise, especially today, it is imperative to provide protection for valuable materials such as jewelry, financial files, financial documents, credit cards, intelligence files, etc. Since the transportation of these objects cannot always be restricted to armed and secure vehicles, individuals must be relied on to transport these valuables. To enable an individual to securely transport these valuables, a portable security case or container must be provided.

DESCRIPTION OF THE PRIOR ART

U.S. Published Patent Application No. 2005/0225432 discloses a method of transporting an alarmed container. The alarmed container is used to transport valuables. The alarmed container includes a first electronic unit which functions to accept and permit deactivation and/or opening of the alarmed container. The container is opened with the aid of a primary key which includes a second electronic unit that communicates with the first electronic unit in respect of initiating opening of the container. The primary key accompanies an individual transporting the container and the container is opened and/or its alarm system deactivated at its destination with the aid of a code subset from the individual carrying the primary key in co-action with a code subset obtained from a destination-located secondary key, therewith providing a total code-set required for initiating opening/deactivation of the container.

SUMMARY OF THE INVENTION

The present invention is a self contained, portable security case or container. The case is secure in its locked condition by locks which are preferably operated by an electronic key. The electronic key can be programmed to open the case or container dependent upon various different conditions; for example, location, time, identification of operator, etc. In addition to the electronic key, a biometric identification device can be employed. The exterior of the case or container is made from different materials which are impermeable and resistant to heat, drilling and ballistic impact. A GPS type of location device located within the case enables the case to be tracked from remote locations.

Accordingly, it is an objective of the present invention to provide a security case comprising a plurality of layers which are resistant to unauthorized entry thereinto.

It is a further objective of the present invention to provide a security case including a security system contained therein which permits entry into the security case only by authorized individuals.

It is yet another objective of the present invention to provide a security case which includes a location device which permits an individual to track the current and past locations of the security case.

It is a still further objective of the present invention to provide a security case including a security system which utilizes electronic keys to gain entry into the security case.

It is still another objective of the present invention to provide a security case including a location device which utilizes satellites to record and transmit the location of the security case to an individual at a location remote from the security case.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIGS. 1-11, which are now referenced, illustrate the present invention and the manner in which it is assembled. A preferred embodiment of the present invention comprises a portable case or container 10 which is constructed and arranged to securely transport valuable articles. The case is constructed of materials which are resistant to penetration by means such as drilling, impact, ballistic, thermal, etc. The specific materials of construction will be disclosed hereinafter. The case is also designed to resist direct penetration into the interior by providing a tortuous path from the joint of the lid and case into the interior of the case.

Figure 1:
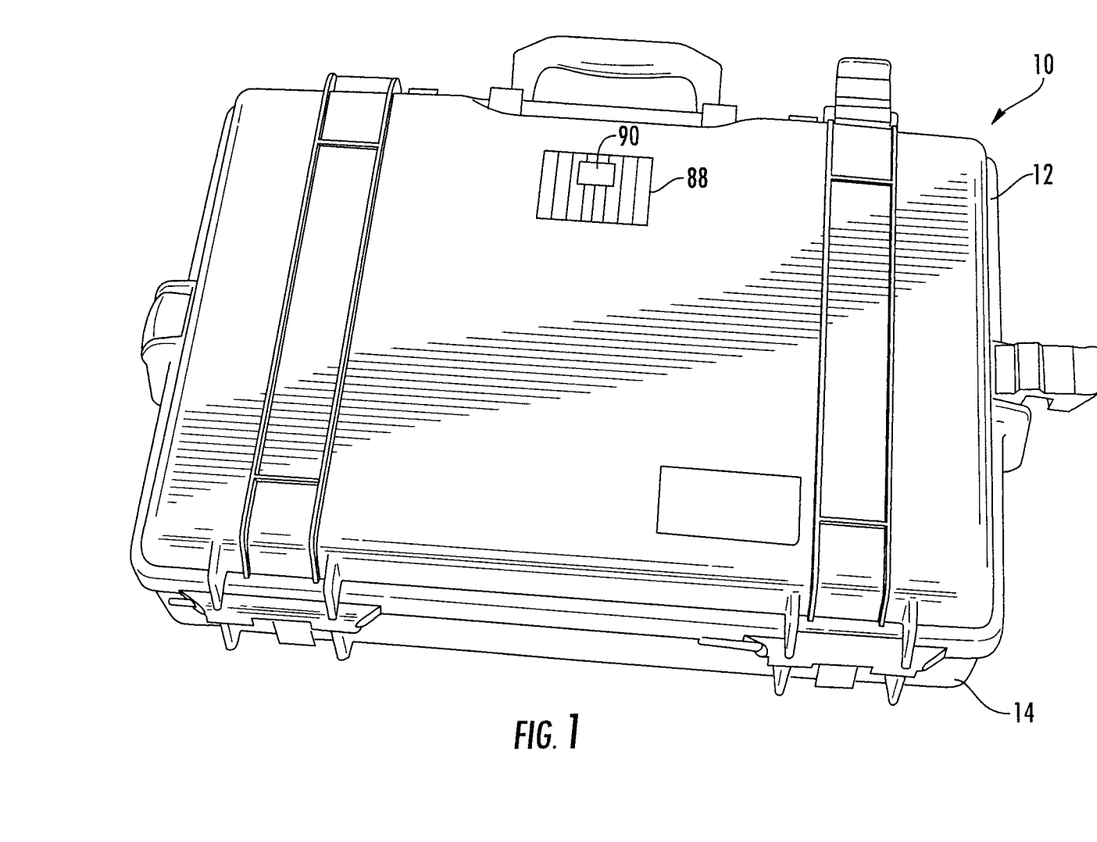
FIG. 1 is a top perspective view of the present invention.
Figure 2:
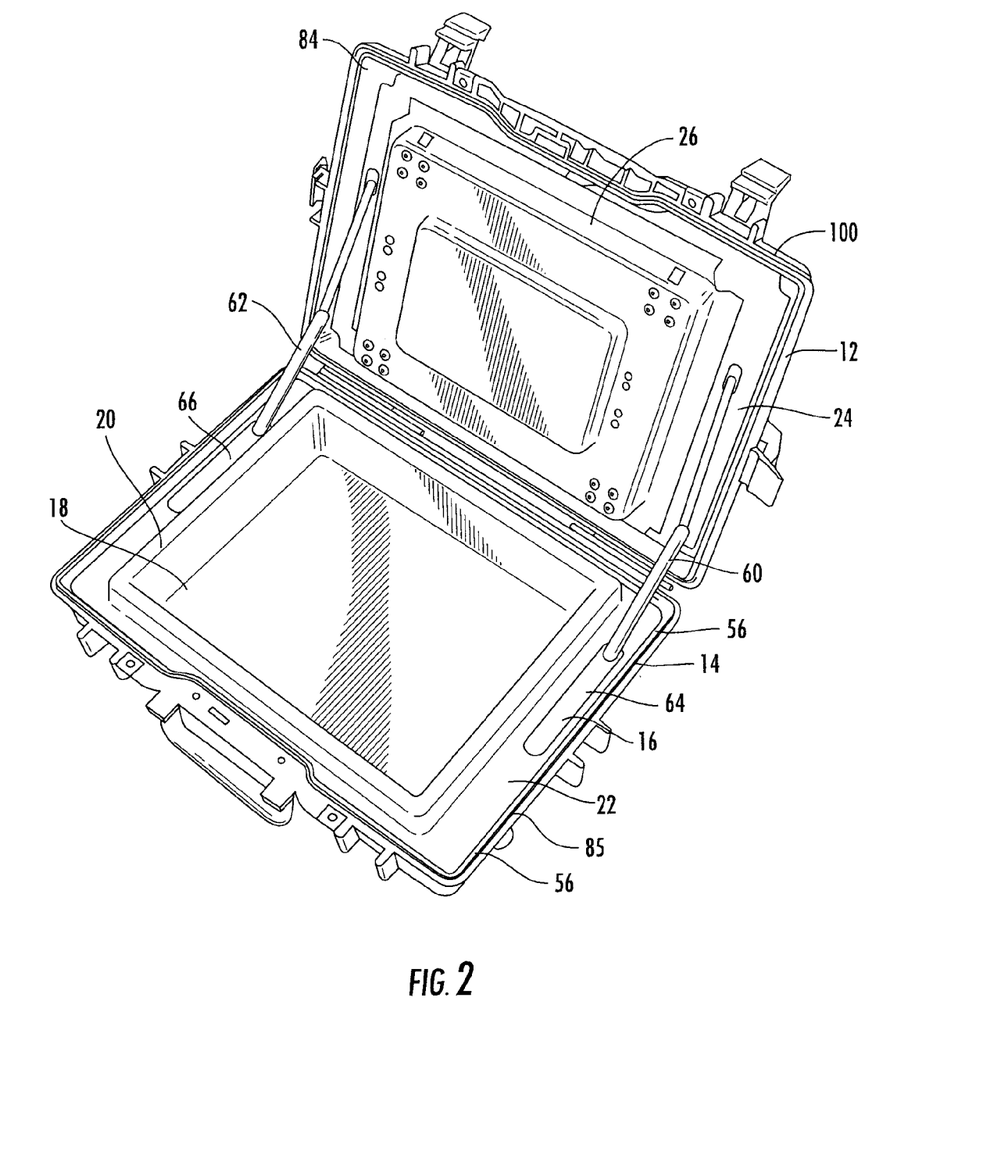
FIG. 2 is a perspective view of the interior of the present invention.

FIGS. 1-7 illustrate a preferred embodiment of the present invention which includes a body 10 comprising a cover or lid 12 hingedly secured to a lower portion or base 14. The lower portion 14 includes an insert 16. The insert 16 includes a cavity or lower chamber 18, an upstanding wall or perimeter portion 20 and a spacer or buffer area 22. The valuable articles to be securely transported are housed within the cavity or chamber 18. As can be seen in FIG. 2, the cavity or chamber 18 does not extend to the outermost edges of the lower portion 14. The upstanding wall or perimeter portion 20 extends completely around cavity 18. The spacer or buffer 22 extends outwardly from the cavity upstanding wall 20 to the edge of the lower portion of case 14. The upstanding wall 20 and cavity spacer 22 provide a tortuous path from the edge of the case 10 to the cavity 18, thereby preventing direct access to the cavity 18. This prohibits someone from inserting a thin metal object or similar item to gain access to the contents of cavity 18.

Figure 3:
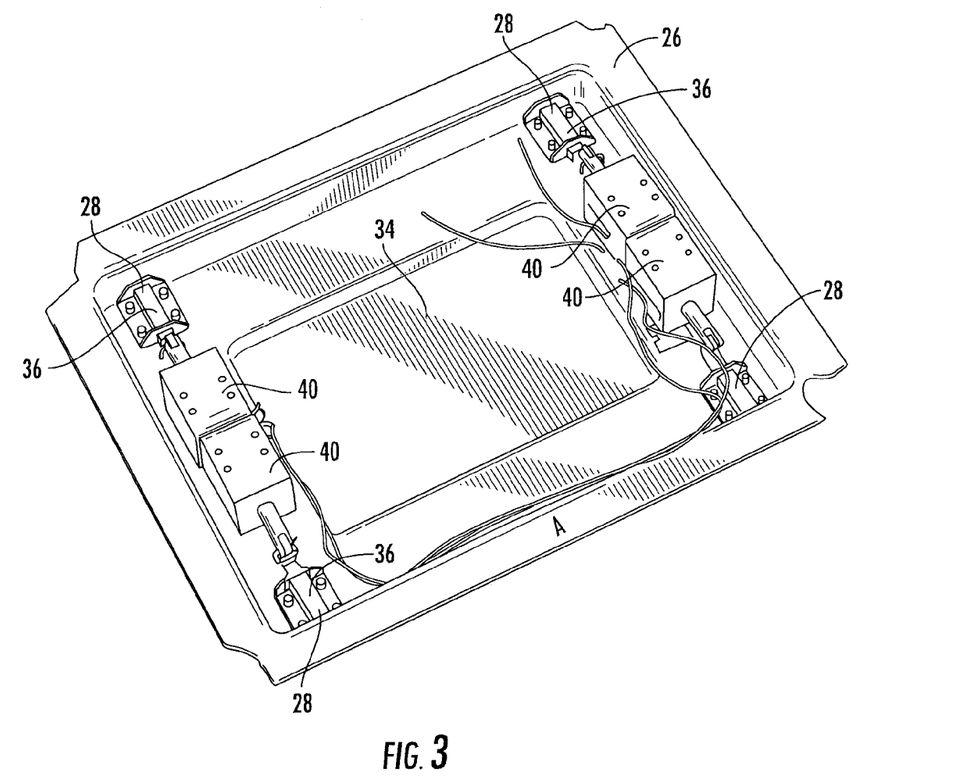
FIG. 3 is a view of the locking mechanism of the present invention.
Figure 4:
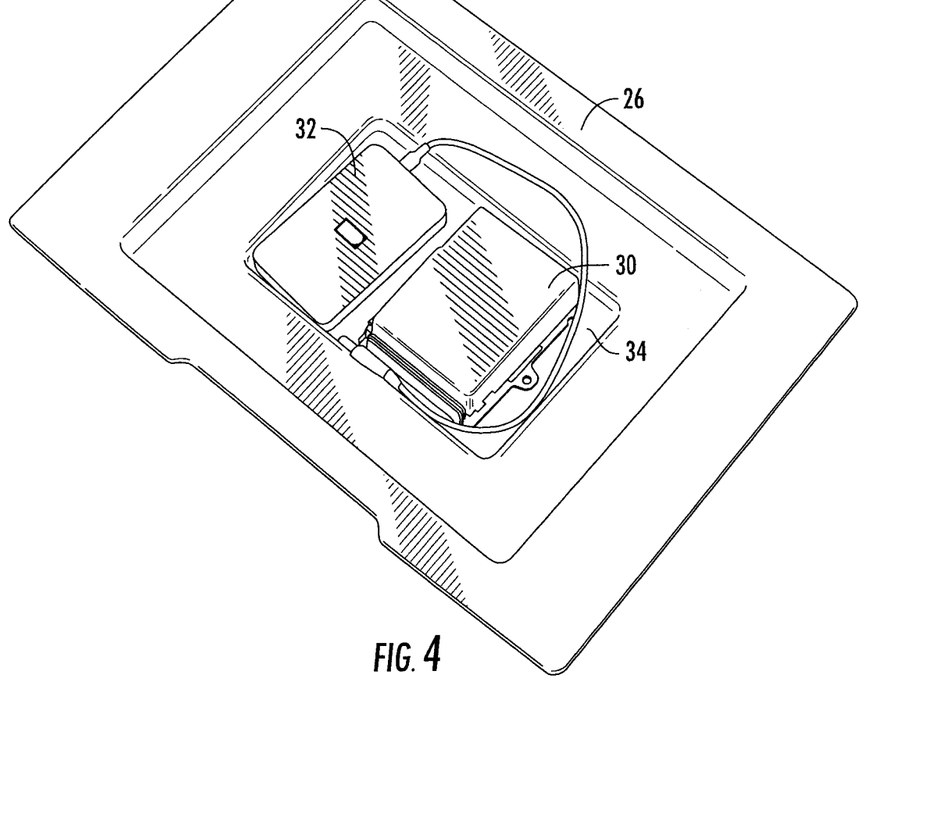
FIG. 4 is a view of the location device and hard drive of the present invention.
Figure 6A:
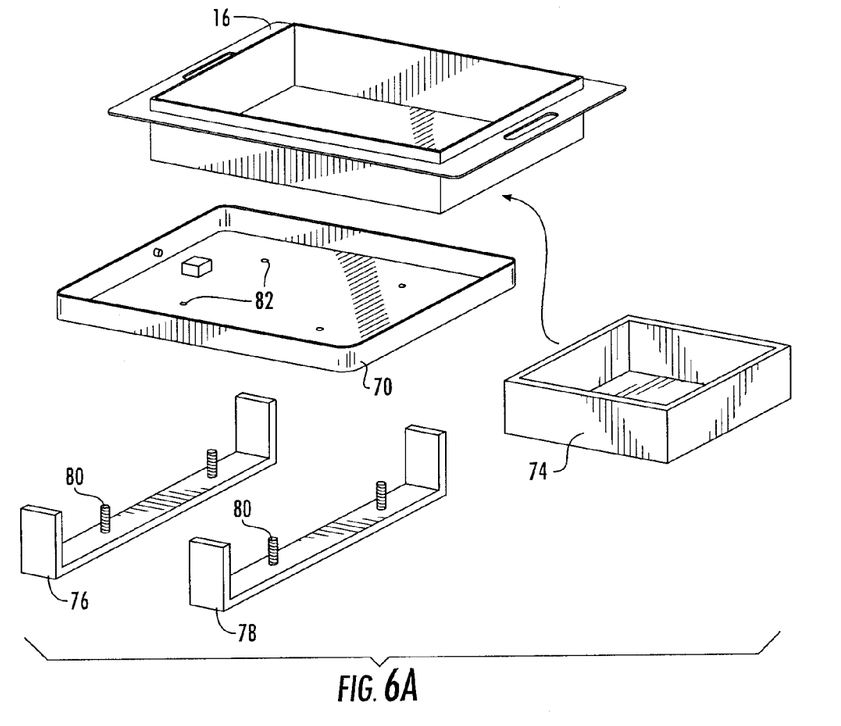
FIG. 6A is an exploded view of a lower portion of the case of the present invention.
Figure 6B:
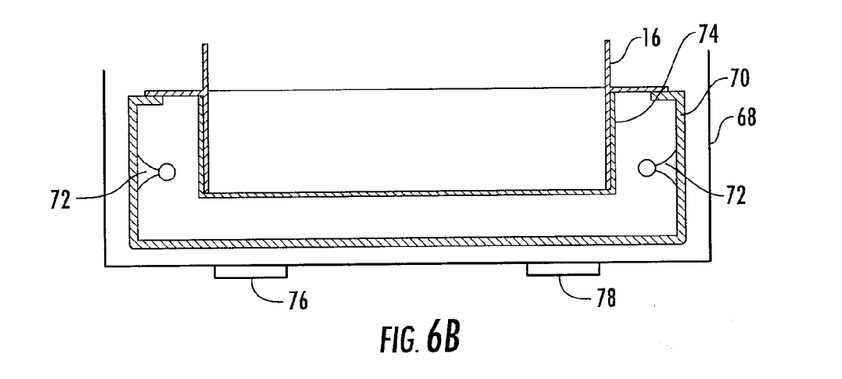
FIG. 6B is a cross sectional view of a lower portion of the case of the present invention.
Figure 6C:
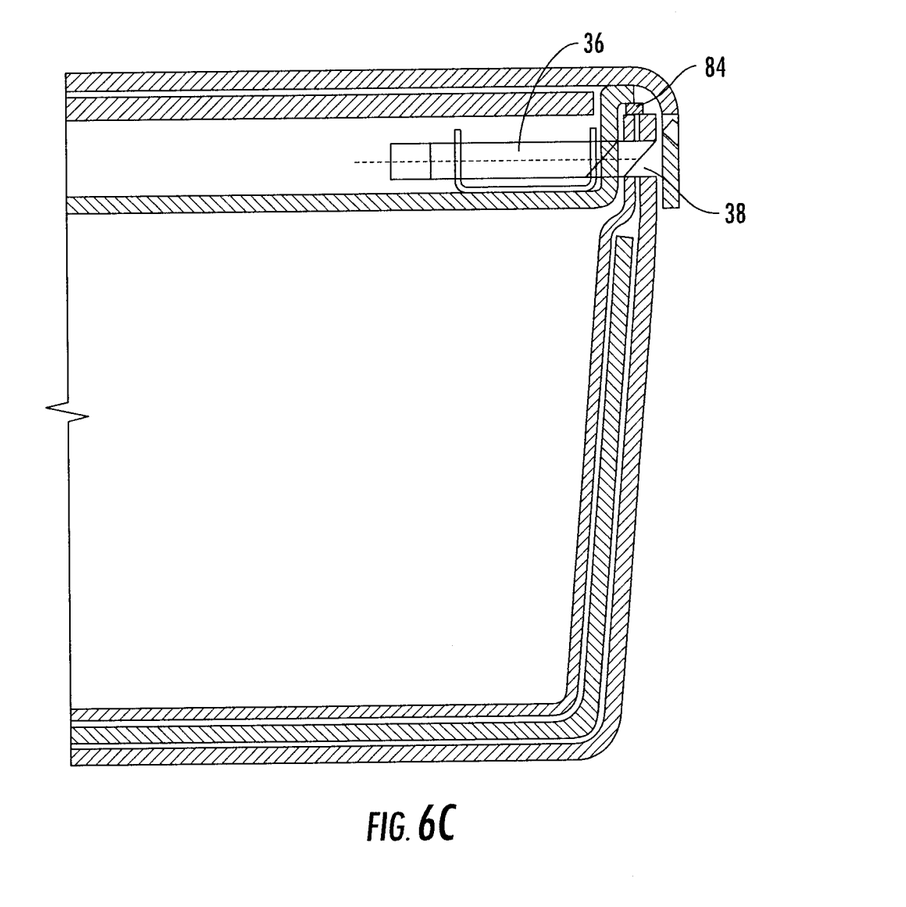
FIG. 6C is a cross sectional view of a lower portion of the case of the present invention.

The cover or lid 12 of the case 10 includes an insert or spacer 24 and a housing or upper chamber 26 (FIG. 2). The housing or upper chamber 26 contains the locks 28 which secure the case 10 closed (FIG. 3). The housing or upper chamber 26 also contains a GPS location device 30 and a hard drive 32 (FIG. 4). The location device 30 and hard drive 32 are contained within a depression or well 34 of the upper chamber 26. The location device 30 and hard drive 32 are not illustrated in the upper chamber 26 of FIG. 3. The locks 28 are not illustrated in the upper chamber 26 of FIG. 4. The manner in which the locks 28 secure the lid 12 to the lower portion 14 is illustrated in FIG. 6C. A pin or locking member 36 is an element of each of the four locks 28. The pin 36 moves in a longitudinal direction between an extended or locked position, as illustrated in FIGS. 2 and 6C and a retracted or open position. In the retracted or open position the pin 36 does not extend into an aperture in the side of the lower portion 14 of the case. In the locked position, the pin 36 extends into the aperture 38 in the side of the lower portion (FIG. 6C).

Figure 5:
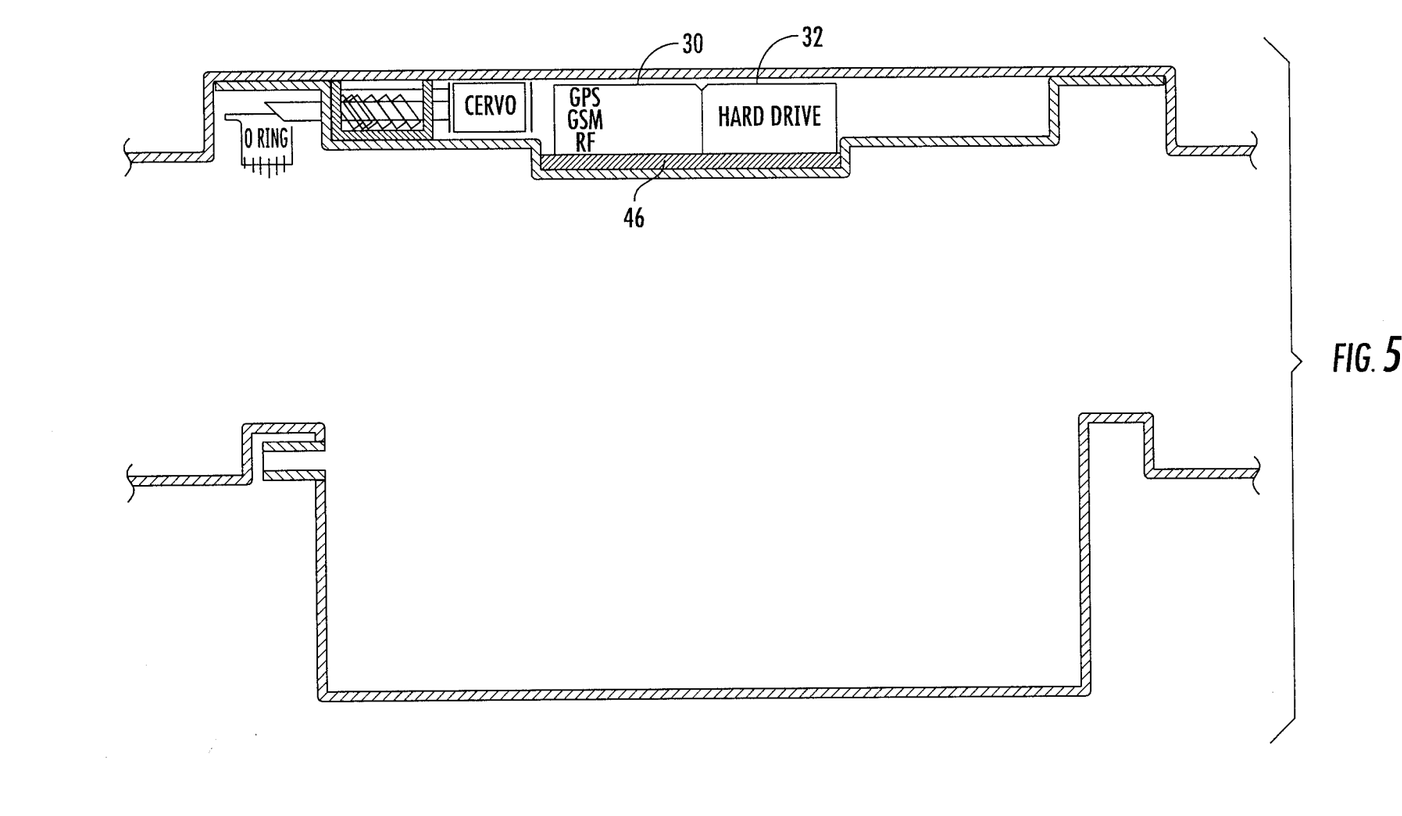
FIG. 5 is a cross sectional view of the present invention.
Figure 7:
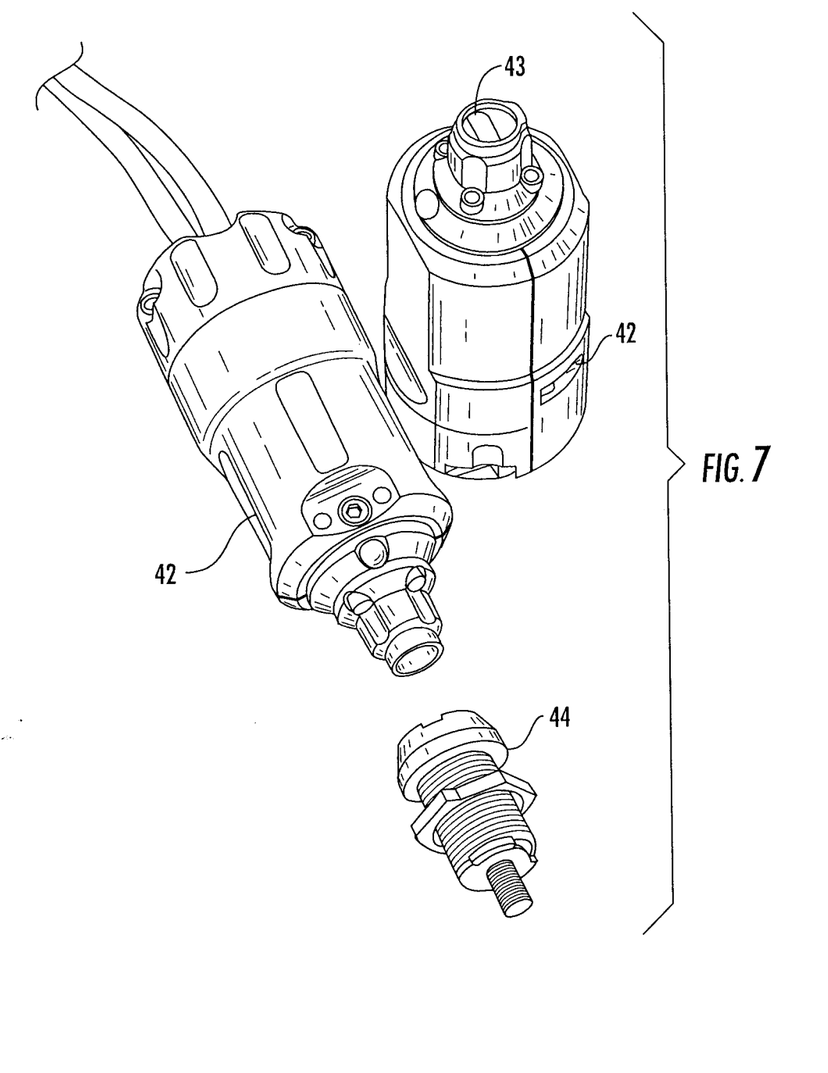
FIG. 7 is a view of the electronic key of the present invention.
Figure 8:
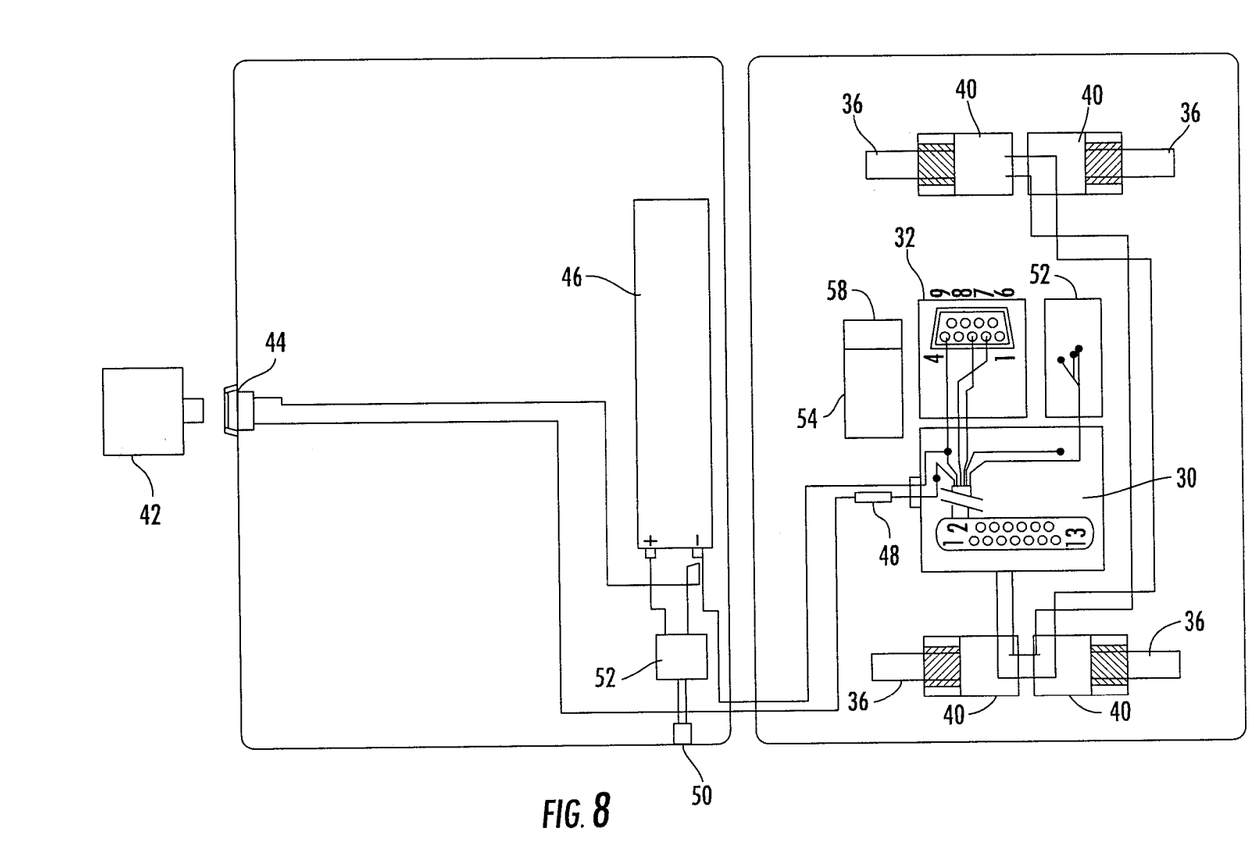
FIG. 8 is a schematic of the electronic locking system of the present invention.

Each of the pins 36 is operated by a solenoid 40. The solenoids 40 are preferably operated according to the schematic of FIG. 8. An electronic key 42 is utilized to open lock 44 (FIGS. 7 and 8). When lock 44 is open an electrical circuit is completed. The electrical circuit includes lock 44, a battery 46, a fuse 48, and solenoids 40. While the battery is preferably located within the depression or well 34, it could be located anywhere within the case 10. When the battery 46 is located within the well 34, it is preferably a flat and relatively thin type of battery, as illustrated in FIG. 5. An electrical connection 50 is provided through the outer shell of the case. The electrical connection 50 is preferably in the upper portion or lid of the case, but it can also be in the lower portion of the case. The electrical connection 50 is electrically connected to a processor or controller 52 which regulates the amount and duration of current sent to the battery 46 to recharge the battery. Depending on the type of battery 46, nickel cadmium, nickel metal hydride, lithium ion, lithium ion polymer, etc., the amount of current and rate at which the current is sent to the battery for recharging will be variable in order to protect the battery from overcharging and/or overheating. The electrical power or energy supplied to the connection is preferably from a transformer which converts 120 AC (Alternating Current) voltage to DC (Direct Current) voltage. The amount of DC voltage delivered to the battery is dependent upon the type of battery being recharged. In place of solenoids 40, stepper motors can also be employed. The stepper motors drive a worm which is connected to a worm gear (not shown), which in turn operates said locks 28. An advantage of said stepper motor is that said locks 28 cannot be driven backward, thereby preventing access to the interior of said case.

The electronic key 42 can be programmed to only open specific locks 44. The electronic key 42 includes a plurality of contacts 43 which electrically connect with respective contacts (not shown) on the lock 44. When the lock 44 receives the proper signals or indicators it permits the electronic key to physically turn and open the lock 44. Preferably, an electronic key locks the case at a point of departure and a separate different electronic key at the final destination opens the case. The electronic keys can also be programmed to only open the case at a certain time or within a certain time frame or window. Another feature of the electronic key is that it can be disabled or enabled from a signal transmitted by a satellite, a cell phone or a radio frequency transmission.

Figure 9:
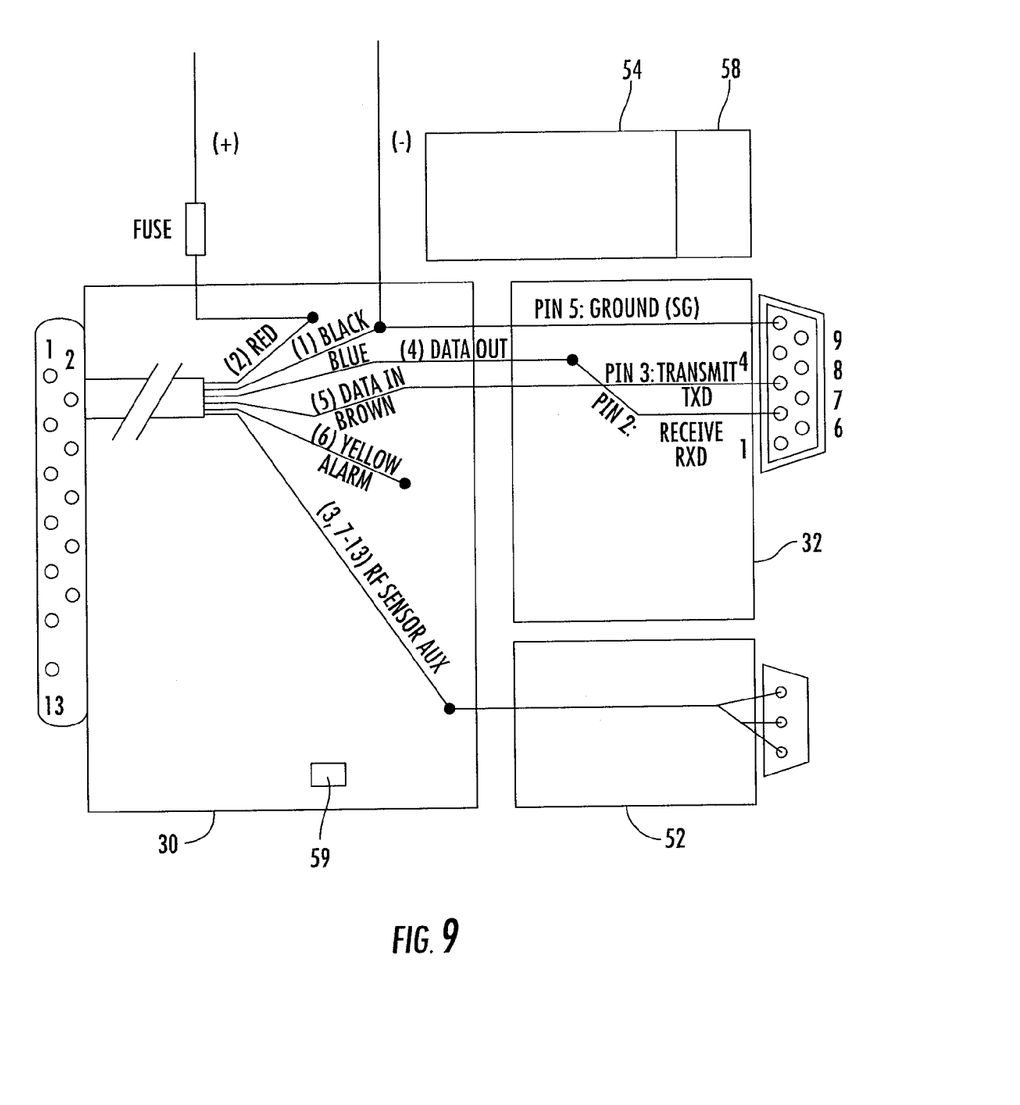
FIG. 9 is a detailed view of a portion of FIG. 8.
Figure 10:
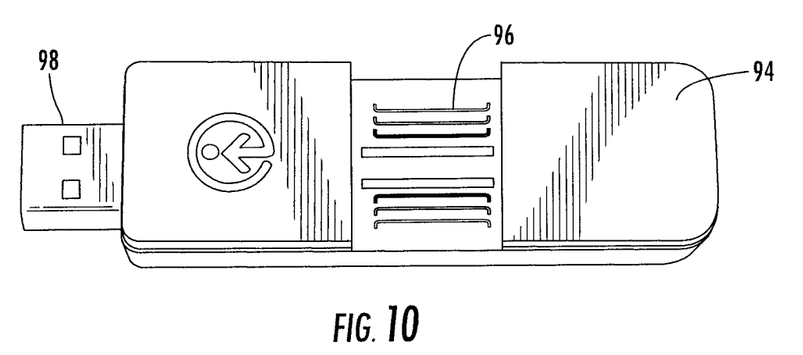
FIG. 10 is a view of a biometric key of the present invention.

Another embodiment of the present invention is illustrated in FIGS. 8 and 9. In this embodiment a location device 30, a hard drive 32 and a proximity sensor 52 are located within the depression or well 34. The location device utilizes GPS (Global Positioning System), GSM (Group Special Mobile), and RF (Radio Frequency) signals to determine the location of the case 10. The GPS utilizes satellites and triangulation to determine the location of the case 10. The GSM and RF systems utilize cellular telephones and triangulation to determine the location of the case 10. The location device can be programmed to monitor the various locations of the case as it travels from one location to another. This information is then stored in the hard drive 32. The location device 30 can also communicate with a user's cellular phone or similar device to transmit the various locations of the case as it travels from one destination to another. This information can be transmitted via RF or GSM. The location device 30 can also transmit a satellite picture of the location of the case or container to a user at a remote location. In addition, the ZigBee® wireless technology can be employed to transmit the above noted information. This technology is an open global standard that is often employed whenever there is difficulty with RF transmissions, no cell phone towers, etc. When ZigBee® is used for transmission of data, a chip is normally located adjacent the location device 30. The location device 30 is preferably provided with a back-up battery in the event that the main battery 46 goes dead. The back-up battery can be used to transmit the location of the case.

The proximity sensor 52 will detect the presence of an individual who has been provided with a smart key or similar device. The proximity sensor 52 is programmed to respond when a smart key or similar device is within a predetermined distance of the proximity sensor 52. The electronic smart key or similar device is normally given to the courier of the case 10. The proximity sensor then sends a signal to the hard drive that an individual with the proper credentials, the courier, is within a predetermined distance of the case. Should the courier go outside of a predetermined distance or range, this is an indication that the courier has left or abandoned the case. Another signal is then sent to the hard drive to indicate this condition. The location device can also be programmed to immediately transmit the signal that the courier has left the case to the user. The user normally receives these reports in the form of an e-mail notification. However, other types of cellular phone communications can be employed to notify the user of the location of the case. The e-mail communications can also include a map of the current and previous locations of the case. This enables a user to print out a hard copy of the current and past locations of the case. This also enables a user to track the path of the case as it moves from one location to another. Should the case move from a predetermined path, the user may alert the authorities or similar individuals that the case has been stolen or diverted from its predetermined path.

A processor or controller 54 can be provided adjacent to hard drive 32. The processor or controller 54 is programmed to control and monitor various operations of the case 10. For example, the controller 54 can be programmed to transmit the location of the case at predetermined time intervals. The controller can also be programmed to transmit the saved locations of the case to a user at predetermined times. The controller can notify an individual immediately or at a predetermined delay if and when the courier has left or abandoned the case. The controller can be programmed to determine, from consecutive location transmissions, if the case has been removed from or been diverted from a predetermined path. This would indicate that the contents of the case may have been tampered with.

A plurality of sensors 56 (FIG. 2) can be positioned around the perimeter of the case between the lower portion of the case and the lid of the case. These sensors 56 can determine if the lid of the case has been moved, indicating that the case has been opened. A light sensor 59 on the location device 30 can also be utilized to indicate if the case has been opened. The controller can be programmed to transmit a signal if the case has been opened by an unauthorized individual, which is an indication of a potential robbery or theft. The controller can be programmed to recognize authorized opening of the case within a certain time range. It can also be programmed to recognize authorized opening of the case at a specific predetermined location. Unauthorized opening or entry into the case is recognized by the controller and this information is transmitted to an alarm 58. The alarm 58 can emit an audible signal within the case, a visual signal outside of the case, and/or it can transmit the information of unauthorized entry to a remote location. The remote location can be a user or a security monitoring service. In either situation, a user is ultimately notified that there is a problem with the transportation or unauthorized entry into the case.

Another feature of the tracking system is that if the case has not moved within a predetermined time, 3 hours for example, the system goes into a "sleep" mode to conserve the battery. In the sleep mode the location tracking and reporting of the case is suspended. The sleep mode of the monitoring system can be ended by movement of the bag or by transmitting a signal to the monitoring system to stop the sleep mode. This can also be accomplished by pressing a button on the case.

The lid 12 is also secured to the lower portion 14 of the case by a pair of gas shock hinges 60 and 62 (FIG. 2). These hinges pass through the top of insert 16 through slots 64, 66. The hinge is pivotally secured to the lower portion of the case, and also to the lid of the case. FIG. 6B is a cross section of the lower portion of the case. An outer shell 68 is preferably formed from Dyneema. This material can not be cut by conventional means. Next, a tub or trough shaped layer or element 70 is located within the outer shell 68. The element 70 is preferably made from titanium; however, similar materials can be used which are resistant to penetration by drilling. The element 70 is provided with mounts 72 for the lower portions of hinges 60 and 62. The mounts 72 permit the gas shock hinges to be pivotally secured to the lower portion of the case. The next element or layer 74 within element 70 is also tub or trough shaped. Element 74 is made from an aramid material. This material is resistant to ballistic penetration. Finally, the insert 16 is located within element 74. Insert 16 is preferably made from a polycarbonate material.

Figure 11A:
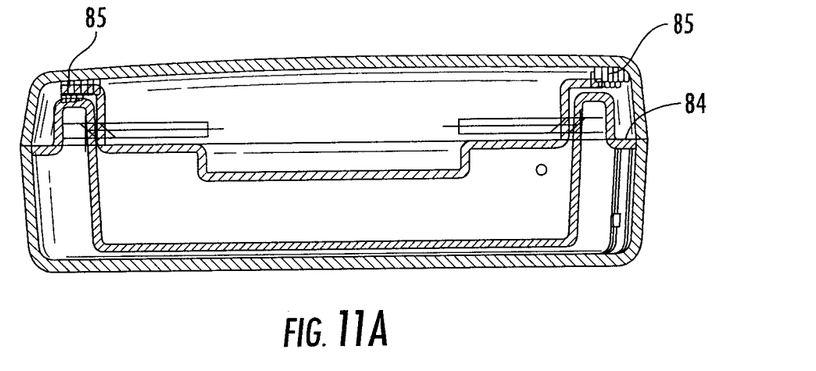
FIG. 11A is a cross sectional view of another embodiment of the present invention in a closed position.
Figure 11B:
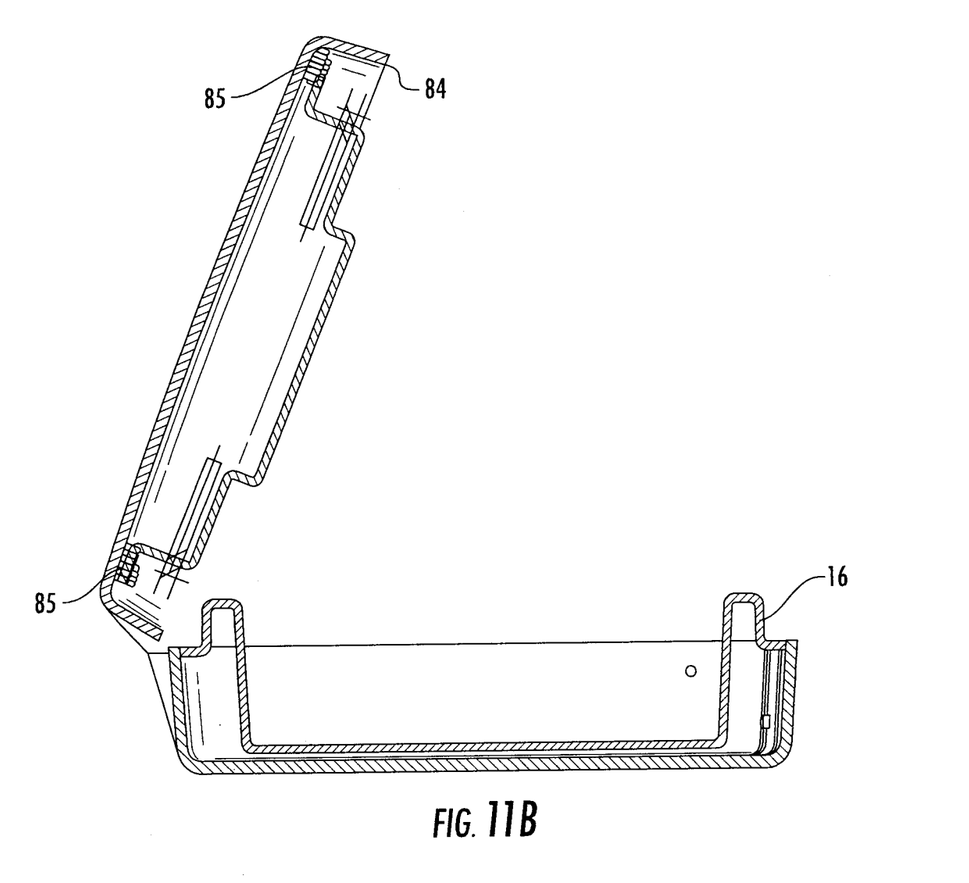
FIG. 11B is a cross sectional view of the embodiment in FIG. 11A in an open position.

A plurality of metal straps 76, 78 are secured to the outer portion of outer shell 68. The straps 76, 78 are provided with a number of threaded studs 80. The studs 80 pass through apertures 82 in element 70 and are secured thereto by nuts or similar means. Element 74 is preferably adhesively adhered to element 70 and insert 16. Other means to secure these elements together can also be employed. The lid 12 of the case is constructed in a manner similar to the lower portion of the case. This type of construction prevents unauthorized entry into the case by most means. The outer perimeter of the lid includes an O-ring or seal 84. The O-ring or seal abuts the upright ridge 86 on the lower portion of the case to form a fluid tight seal. This seal prevents penetration into the case by any type of fluids. An additional seal 85 can be provided between the lid and the upper rim of insert 16 (FIGS. 11A and B). The seal 85 extends completely around the lid and insert 16.

Referring to FIG. 1, a biometric detection device, such as a finger print detector 88, is preferably secured to the lid of the case. The biometric detection device 88 includes an aperture 90 for placement of finger therein. A sensor below the aperture 90 detects the finger print and sends this information to a controller or chip 92 (not shown) located adjacent controller 54. The controller 92 compares the current finger print against the authorized finger prints and permits the case to be opened when a proper match is achieved. Additionally, a particular sensor can be employed which will only authorize entry into the case when a finger on the left hand of an individual is used. This system can be programmed to only open one side of the case when the right hand of an individual is placed into the sensor 88. Additionally, a portable biometric sensor 94 (FIG. 10) can be utilized to gain entry into the case. The portable biometric sensor 94 includes an aperture 96 into which an individual places their finger. The portable biometric sensor 94 includes a USB connector 98. This USB connector can be inserted into a USB receptacle or slot 100 located at the front of the lid, FIG. 2.

Additionally, a Faraday cage can be provided in the interior of the case 10. The Faraday cage will prevent unauthorized RF transmissions into the case. The titanium element 70 can also function as a Faraday cage.

Figure 12:
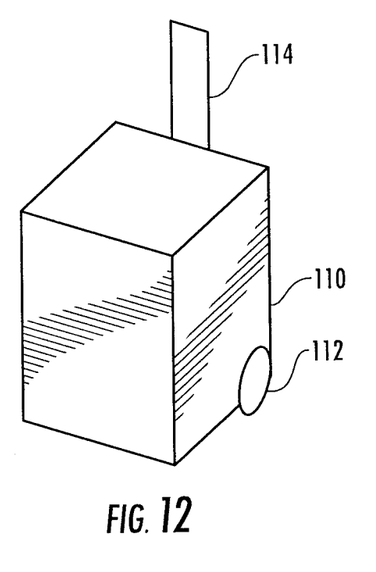
FIG. 12 is a view of another embodiment of the present invention.

FIG. 12 is an alternative embodiment of the present invention. In this embodiment, the case 110 is substantially larger than case 10. Additionally, the case is provided with wheels 112 for ease of transport of the relatively large case. Further, a retractable handle 114 is secured to a rear portion of case 110. The interior construction of case 110 is similar to the interior construction of case 10.

All patents and publications mentioned in this specification are indicative of the level of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A security container for the storage and transportation of valuables comprising:
   an outer body layer, said outer body layer including a lid having a rectangular top wall with opposing endwalls and opposing sidewalls depending therefrom and a base having a rectangular shaped bottom wall having a plurality of apertures, with a first and second opposing endwalls and a first and second opposing sidewall upstanding therefrom, said lid and said base constructed and arranged for interfitting engagement with each other and said sidewalls defining an interior of said body;
   said lid and said base being hingedly connected to each other for pivotal movement between open and closed positions forming a lid and a base interior chamber;
   at least two substantially U-shaped straps fixedly attached to said outer body, said substantially U-shaped straps having a plurality of studs attached perpendicular to base of said substantially U-shaped straps, said studs constructed and arranged to cooperate with said apertures in said bottom wall extending into said base interior chamber;
   a first trough shaped layer, having a base and a continuous sidewall extending upward to create a cavity and sized to be positioned within said base internal chamber, said first trough shaped layer base having a plurality of pass through apertures constructed and arranged to cooperate with said studs, said studs configured for cooperation with fasteners, for securing said first trough shaped layer to an inner surface of said rectangular shaped bottom wall;
   a second trough shaped layer, having a base and a continuous sidewall extending upwards to create a cavity, said second trough shaped layer configured to be positioned within said first trough shaped layer, whereby a predetermined space is maintained between said second trough shaped layer and said first trough shaped layer, whereby at least one electronic device is positioned for monitoring at least one parameter of said security container;
   a third trough shaped layer, having a base and a continuous sidewall extending upwards to create a cavity, said third trough shaped layer configured to be positioned within said second trough shaped layer; locks located within and secured to said lid chamber; said locks having a first actuated pin for engaging an inner surface of said base first sidewall and a second actuated lock pin for engaging an inner surface of said base second opposing sidewall, said locks constructed and arranged to releasably engage said walls of said base thereby locking said lid to said base;
   a biometric device being programmable to recognize specific authorized individuals constructed and arranged allowing operation of said locks; a battery and mechanism to operate said locks upon receipt of proper authorization;
   a location device constructed and arranged to determine a location of said body and programmable to allow operation of said security container at said predetermined location and transmit coordinates of said location to a different remote location.

2. The security container of claim 1 wherein said biometric device is positioned on an exterior portion of said security container.

3. The security container of claim 1 including a fluid seal positioned on and extending completely around one of said lid or said base, said fluid seal completely sealing the interior of said body from the introduction of fluids thereinto.

4. The security container of claim 1 including a Faraday cage positioned within one of said lid or said base.

5. The security case of claim 1 wherein said actuating pins are moved from an unlocked position to a locked position by individual servo motors coupled to said locks.

6. The security container of claim 1 wherein said actuating pins are moved from an unlocked position to a locked position by individual stepper motors operating coupled to said locks.

7. The security container of claim 1 including a memory connected to said security container and said location device, said memory recording various locations of said security container and times when said security container is opened, said location device including a transmitting device transmitting information regarding the current location, the past locations, and the opening of said security case to a remote location.

8. The security container of claim 7 wherein said transmitting device operates using satellite, group special mobile and/or radio frequency signals.

9. The security container of claim 7 including a backup battery connected to said security container, said backup battery operative to permit transmission of the location of said security container upon failure of a main battery of said security container.

10. The security container of claim 1 wherein said security container includes a proximity sensor, said proximity sensor detects the proximity to said security container of an individual authorized to have access to said security container and permits entry into said security container.

11. The security container of claim 1, wherein said third trough shaped layer including a continuous surface extending outward from said continuous sidewall to said base interior chamber defining a buffer zone, said continuous surface positioned at a predetermined distance below the top of said continuous sidewall creating a tortuous path from outside said container to said cavity, thereby preventing direct access to said cavity.

12. The security container of claim 11, wherein said buffer zone is fixedly attached to top of said first trough shaped layer.

13. The security container of claim 1, wherein said predetermined space between said first trough shaped layer and said second trough shaped layer is configured for positioning of operational devices.

14. The security container of claim 1, wherein said substantially U-shaped straps is comprised of a rigid metal.

15. The security container of claim 1, wherein said first trough shaped layer is comprised of titanium.

16. The security container of claim 1, wherein said second trough shaped layer is comprised of aramid material.

17. The security container of claim 1, wherein said third trough shaped layer is comprised of polycarbonate material.

18. The security container of claim 1, wherein said outer body layer is comprised of ultra-high molecular weight polyethylene.

* * * * *